UNITED STATES PATENT OFFICE.

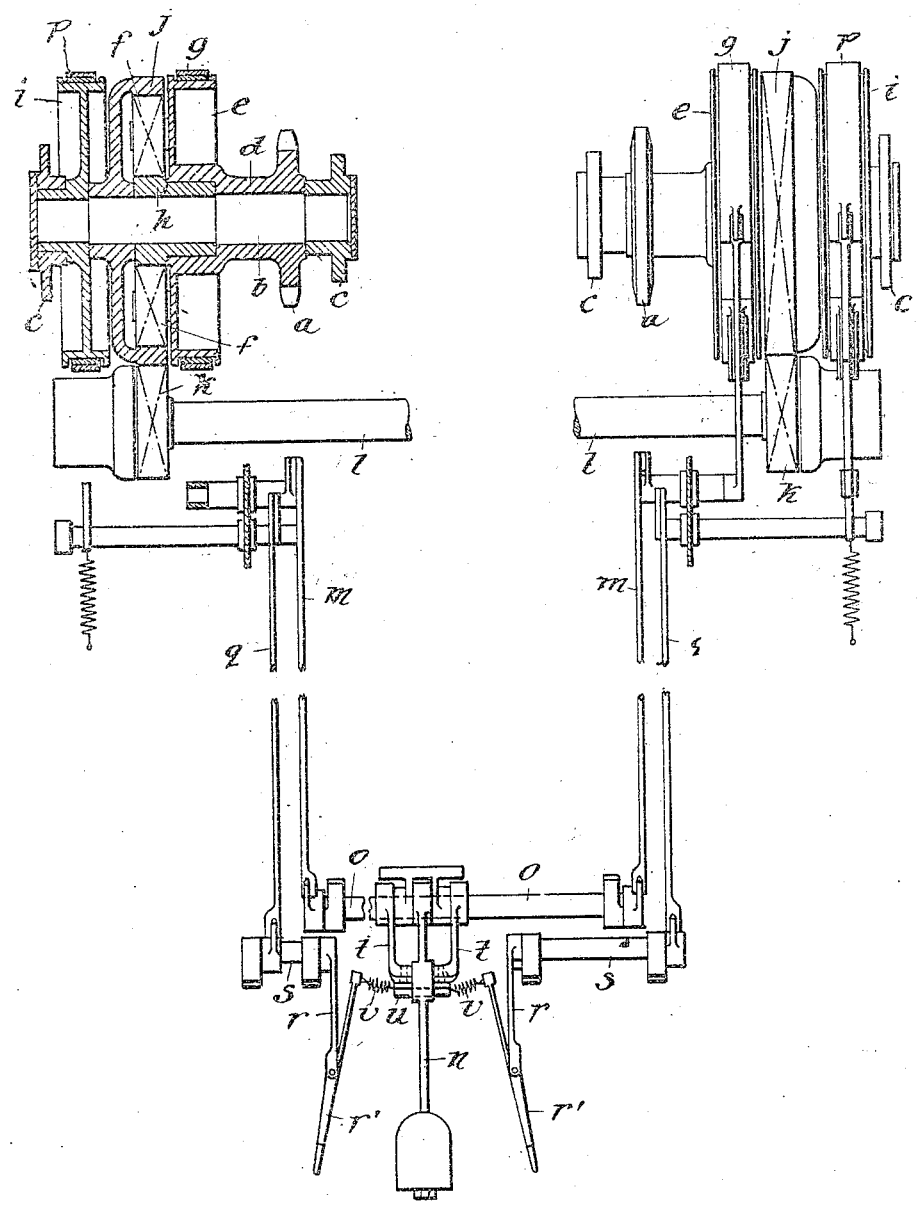

WALTER GORDON WILSON, OF FARNINGHAM, ENGLAND.

DRIVING MECHANISM FOR HEAVY MECHANICALLY-PROPELLED VEHICLES.

1,306,652.   Specification of Letters Patent.   Patented June 10, 1919.

Application filed September 19, 1917. Serial No. 192,103.

*To all whom it may concern:*

Be it known that I, WALTER GORDON WILSON, major, M. G. C., H. S., residing at Charton, Farningham, Kent, England, subject of the King of Great Britain and Ireland, have invented certain new and useful Improvements Relating to Driving Mechanisms for Heavy Mechanically-Propelled Vehicles, of which the following is a specification.

This invention relates to driving mechanisms for heavy mechanically propelled vehicles, and has for its object to provide improved control of the track chains or driving wheels in contact with the ground, the system employed being of the type in which the track chain wheels are driven by independent mechanism from a common shaft. Each mechanism involves the use of two brakes or a brake and a clutch or two clutches, which elements are herein generically referred to as controllers.

The invention comprises the operation of one of the controllers in each mechanism by its own lever and the other by a lever which is common to the corresponding controller in the other mechanism, the levers being connected in such a manner that while the latter set of controllers can be applied simultaneously each of these controllers can also be applied independently when the other controller in the same mechanism is released. Further the invention comprises the combination with each track pinion or driving wheel, of an epicyclic mechanism, one part of which is connected to a driving shaft, another to the track pinion or wheel and a third to a brake, a brake being also employed on the second part.

The accompanying sheet of explanatory drawings shows diagrammatically one form of controlling and driving mechanism constructed in accordance with this invention.

In carrying the invention into effect as shown, the separate driving mechanism of each track chain pinion $a$ is mounted on a transverse shaft $b$ which is carried by end bearings $c$. On this shaft is mounted a sleeve $d$ to which is secured the chain pinion $a$ and carrier $e$ for epicyclic pinions $f$, the carrier being shaped to serve as a drum which can be engaged by a brake band $g$. To the shaft is secured a sun pinion $h$ and brake drum $i$, and freely mounted on the shaft is an annulus $j$ provided with internal teeth for gearing with the pinions $f$ and external teeth for gearing with a pinion $k$ on a shaft $l$ from which both mechanisms receive their motion. This shaft is driven in any convenient manner from the engine.

Each brake band $g$ on the planet carrier is connected by suitable linkage $m$ with a pedal $n$ situated between a pair of coaxial independent shafts $o$ and each brake band $p$ on the sun pinion brake disk is likewise connected by suitable linkage $q$ to its own hand lever $r$ on a shaft $s$. Thus each hand operated brake has its own hand lever, but the pedal is common to both of the foot-operated brakes. The pedal $n$ is freely mounted and on opposite sides of it are levers $t$ secured to the shafts $o$. Sliding through the pedal is a clutch piece $u$ which can engage either or both of the levers $t$. When in the central position it engages both levers but when pulled to either side it engages only the lever on that side. To actuate the clutch piece each hand lever is provided with a pivoted part $r^1$ connected to the said piece by a spring $v$. The lever $r^1$ is so mounted on the lever $r$ that any relative movement of the part $r^1$ can only be effected with or after the release of the brake under the control of the lever $r$. This may be effected by arranging the plane of movement of the lever $r^1$ at an angle other than a right angle to the plane of movement of the lever $r$ and so that a component of the pressure applied to the lever $r^1$ serves also to actuate if necessary the lever $r$ as above described.

The epicyclic mechanisms are brought into action for transmitting motion from the main shaft by locking their sun pinions through the medium of the sun pinion brakes. To throw either out of action the corresponding hand lever is manipulated for the release of the sun pinion brake. To lock the planet carrier the foot-operated brake is then applied by means of the pedal. If it is desired to brake both planet carriers when the sun pinions are either free or locked depression of the pedal applies both foot-operated brakes simultaneously.

In a modification the sun pinion is the driver and the annulus is controlled by a brake.

It will be understood that the pedal may be adapted for operation as a hand lever and the hand levers as pedals.

By this invention better control of the track chains or driving wheels is obtained than with the mechanisms commonly employed and further the disadvantages of friction clutches are entirely obviated. When the retention of friction clutches is necessary and each driving mechanism comprises a brake or clutch for retarding motion and a clutch for connecting the mechanism to the driving shaft, the same lever control mechanism may be employed with the introduction of suitable modifications in the connecting linkage.

The invention is not limited to any mechanical details as these may be varied to meet different requirements.

Having thus described my invention what I claim as new and desire to secure by Letters Patent is:—

1. In driving mechanism for heavy mechanically propelled vehicles of the type in which track chains or wheels in contact with the ground are driven by independent mechanism from a common shaft, and each mechanism is provided with a pair of controllers, the combination comprising an independent operating lever for one of the controllers in each mechanism, a common operating lever for the other controllers, means coacting with the independent levers for producing independent or conjoint operation of the other controllers by the common lever, and means connecting the various levers to the controllers, substantially as described.

2. In driving mechanism for heavy mechanically propelled vehicles of the type in which track chains or wheels in contact with the ground are driven by independent mechanism from a common shaft, and each mechanism is provided with a pair of controllers, the combination of an independent lever for one of the controllers in each mechanism, a lever for each of the other controllers, an operating lever common to the latter levers, a clutch piece on the said common operating lever whereby it can be connected to either or both of the levers with which it is associated, means connecting the clutch piece to the first mentioned independent levers and operable thereby, and means connecting the said independent levers and the levers actuated by the common lever to the controllers, substantially as described.

3. In driving mechanism for heavy mechanically propelled road vehicles, the combination comprising a common driving shaft, two track pinions or driving wheels, independent epicyclic mechanism connecting the shaft to the track pinions or driving wheels, two controllers on each epicyclic mechanism, an independent operating lever for one of the controllers in each mechanism, a common operating lever for the other controllers, means coacting with the independent levers for producing independent or conjoint operation of the other controllers by the common lever and means connecting the various levers to the controllers, substantially as described.

In testimony whereof I have signed my name to this specification.

WALTER GORDON WILSON.